United States Patent
Ahnert et al.

(10) Patent No.: US 9,950,760 B2
(45) Date of Patent: Apr. 24, 2018

(54) MULTIPLE POSITION BICYCLE SEAT POST

(71) Applicant: Redshift Sports LLC, Philadelphia, PA (US)

(72) Inventors: Stephen Dewei Ahnert, New York, NY (US); Erik Teig De Brun, Philadelphia, PA (US); Scott David Poff, Philadephia, PA (US)

(73) Assignee: Redshift Sports LLC, Philadelphia, PA (US)

( * ) Notice: Subject to any disclaimer, the term of this patent is extended or adjusted under 35 U.S.C. 154(b) by 88 days.

(21) Appl. No.: 14/888,375

(22) PCT Filed: May 5, 2014

(86) PCT No.: PCT/US2014/036856
§ 371 (c)(1),
(2) Date: Oct. 30, 2015

(87) PCT Pub. No.: WO2014/179815
PCT Pub. Date: Nov. 6, 2014

(65) Prior Publication Data
US 2016/0075389 A1   Mar. 17, 2016

Related U.S. Application Data

(60) Provisional application No. 61/818,999, filed on May 3, 2013.

(51) Int. Cl.
*B62J 1/00*  (2006.01)
*B62J 1/08*  (2006.01)
(Continued)

(52) U.S. Cl.
CPC . *B62J 1/08* (2013.01); *B62J 1/04* (2013.01); *B62J 1/065* (2013.01); *F16C 11/04* (2013.01); *B62J 2001/085* (2013.01)

(58) Field of Classification Search
CPC ....... B62J 1/065; B62J 1/08; B62J 1/00; B62J 1/06; B62J 1/04; B62J 2001/085; F16C 11/04; F16C 11/002
(Continued)

(56) References Cited

U.S. PATENT DOCUMENTS

| | | |
|---|---|---|
| 3,891,333 A | 6/1975 | Corderac'k |
| 4,502,811 A | 3/1985 | Patriarca |

(Continued)

FOREIGN PATENT DOCUMENTS

| | | |
|---|---|---|
| DE | 102005043423 | 3/2007 |
| EP | 0897857 | 2/1990 |

(Continued)

OTHER PUBLICATIONS

International Search Report for PCT/US2014/036856.

*Primary Examiner* — Chi Q Nguyen
(74) *Attorney, Agent, or Firm* — Gordon Rees Scully Mansukhani, LLP

(57) ABSTRACT

A bicycle seat position changer is provided which allows the rider to quickly change the effective seat tube angle of the bicycle without requiring the use of tools. The seat position changer allows the rider to move the seat between a forward position and a rearward position, allowing a rider to select a more aerodynamic position or a traditional road position while riding, as required for comfort or by riding conditions. The seat position changer allows the rider to adjust the seat position between the forward and rearward positions while maintaining a consistent difference in seat-to-bottom-bracket length. In one embodiment the consistent difference in seat-to-bottom-bracket length is close to zero and imperceptible to the rider.

10 Claims, 11 Drawing Sheets

(51) Int. Cl.
  *B62J 1/06* (2006.01)
  *B62J 1/04* (2006.01)
  *F16C 11/04* (2006.01)

(58) Field of Classification Search
  USPC ...... 297/215.15, 215.14, 215.13, 311, 195.1, 297/204; 403/54, 52, 53
  See application file for complete search history.

(56) References Cited

U.S. PATENT DOCUMENTS

| | | |
|---|---|---|
| 4,983,063 A | 1/1991 | Phillips |
| 5,048,891 A | 9/1991 | Yach |
| 5,346,235 A | 9/1994 | Holman |
| 5,383,706 A | 1/1995 | Chen |
| 5,395,155 A | 3/1995 | Yach |
| 5,441,372 A | 8/1995 | Sanderson |
| 5,446,042 A | 8/1995 | Kobayashi et al. |
| 5,464,271 A | 11/1995 | McFarland |
| 5,489,139 A | 2/1996 | McFarland |
| 5,501,506 A | 3/1996 | Kao |
| 5,513,895 A | 5/1996 | Olson et al. |
| D379,783 S | 6/1997 | Thomson et al. |
| 5,664,829 A | 9/1997 | Thomson et al. |
| 5,702,093 A | 12/1997 | Liao |
| 5,833,255 A * | 11/1998 | Sarder ............ B62J 1/06 280/220 |
| 5,915,675 A | 6/1999 | Chen |
| D413,284 S | 8/1999 | Thomson et al. |
| 6,089,656 A | 7/2000 | Hals |
| 6,270,075 B1 | 8/2001 | Hals |
| 6,409,130 B1 | 6/2002 | Maret |
| 6,827,397 B1 | 12/2004 | Driver |
| 6,848,701 B2 | 2/2005 | Sinyard et al. |
| 7,077,029 B2 | 7/2006 | McColligan et al. |
| 7,322,645 B2 | 1/2008 | Roizen |
| 7,431,391 B2 * | 10/2008 | Hsiao ............ B62J 1/08 297/215.14 |
| 7,559,603 B1 * | 7/2009 | Chiang ............ B62J 1/08 297/215.14 |
| 8,007,041 B2 * | 8/2011 | Tisue ............ B62J 1/08 297/195.1 |
| 8,042,632 B2 | 10/2011 | Cusack |
| D658,096 S | 4/2012 | D'Aluisio |
| 8,262,115 B2 | 9/2012 | Mackenroth |
| 8,267,470 B2 * | 9/2012 | Hsu ............ B62J 1/08 297/215.14 |
| 8,888,117 B2 * | 11/2014 | Barkley ............ B62J 1/065 280/283 |
| 8,894,141 B2 * | 11/2014 | Tisue ............ B62J 1/08 297/205 |
| 9,573,642 B2 * | 2/2017 | Liao ............ B62J 1/08 |
| 2002/0166941 A1 | 11/2002 | Dunlap |
| 2007/0145794 A1 * | 6/2007 | Dal Pra' ............ B62J 1/08 297/195.1 |
| 2014/0110979 A1 * | 4/2014 | Barkley ............ B62J 1/065 297/195.1 |

FOREIGN PATENT DOCUMENTS

| | | |
|---|---|---|
| EP | 1798140 | 6/2007 |
| FR | 2491425 | 4/1982 |
| FR | 2802171 | 6/2001 |
| WO | 2002081291 | 10/2002 |
| WO | 2011058391 | 5/2011 |

* cited by examiner

MULTIPLE POSITION BICYCLE SEAT POST

CROSS-REFERENCE TO RELATED APPLICATIONS

This application is a National Stage Entry of International Application PCT/US2014/036856, filed on May 5, 2014, which claims benefit of priority of U.S. Provisional Patent Application Ser. No. 61/818,999 filed on May 3, 2013, the entire disclosures of which are incorporated herein by reference.

TECHNICAL FIELD

The present invention relates in general to bicycle seat posts and in particular to means for adjusting the position of bicycle saddles relative to the seat posts.

BACKGROUND

Bicycles have been around since the early 1800s. The design of the bicycle is continuously being improved, increasing its efficiency in various aspects. The result is that today we have sleek, lightweight and fast bicycles which are capable of efficiently transferring the energy from the cyclist's legs to the wheels of the bicycle.

Cyclists have many different bicycle styles to choose from, each with their own advantages and disadvantages. However, there are generally two positions used for road cycling, a more upright position as seen when using road bikes, hybrids and mountain bikes, and a more aerodynamic, forward leaning position as seen on time-trial or triathlon bicycles. Cycling enthusiasts frequently desire the advantages of both riding positions. For example, an aerodynamic, forward leaning position is often desirable at higher speeds, when a rider is seeking to minimize wind resistance. The more upright position is often preferred on road bicycles when the rider is climbing hills, maneuvering within a group of riders, or maximizing comfort.

One of the big differences in design on bicycles with these two different styles of riding is the seat (aka "saddle") position. Specialized bicycles, such as those designed for triathlons or time trials, have steeper seat tube angles that place the saddle further forward relative to the bottom bracket. This allows the rider to assume a more aerodynamic position where arms are extended further forward onto cantilevered aero bars and shoulders are lowered, thus reducing a rider's frontal area and creating a more aerodynamic shape. Clip-on aero bar extensions have been developed for road bicycles to allow riders to achieve a similar aerodynamic position, but their use puts the rider in an uncomfortably stretched out position due to the limited forward travel adjustment of the typical seat. Another problem can occur when lowering the torso to assume an aerodynamic position: For a rider bending down and forward into aerobars without adjusting the saddle position, the rider's hip-angle (the angle between the rider's torso and upper leg at the top of the pedal stroke) can become cramped and uncomfortable.

Road bicycle seat posts typically allow adjustment to the height, tilt, and fore-aft position of the saddle within a limited range. However, if a road bicycle cyclist desires to have a more aerodynamic position, he requires specialized seat posts to place the saddle in a significantly further forward position. Once installed, the seat post does not allow the seat to be moved back to a position that would be suitable for normal upright road riding without reinstalling the traditionally positioned seat post.

Likewise, typical saddles assemblies require adjusting the tilt or "seat angle" by loosening a bolt, physically manipulating the position of the saddle to the desired seat angle or tilt, then tightening the bolt to hold the saddle in fixed position. For a rider wanting to change riding styles during a ride, changing the seat angle requires getting off the bicycle to perform these adjustments. For a rider wanting to frequently alternate between two riding styles, there is no way to rapidly, easily, and reliably switch between two reliably consistent seat angles.

The traditional saddle position on a road bike can be uncomfortable when using aero bars and the forward saddle position used with aero bars is not suitable when conditions call for a more traditional upright road position. Switching seat posts is time consuming, may require the use of tools, and typically cannot be done in the middle of a ride. There is thus a need for a means to easily adjust the saddle position during a ride that does not require the use of tools or the replacement of a seat post.

DETAILED DESCRIPTION OF THE INVENTION

Figure 1:
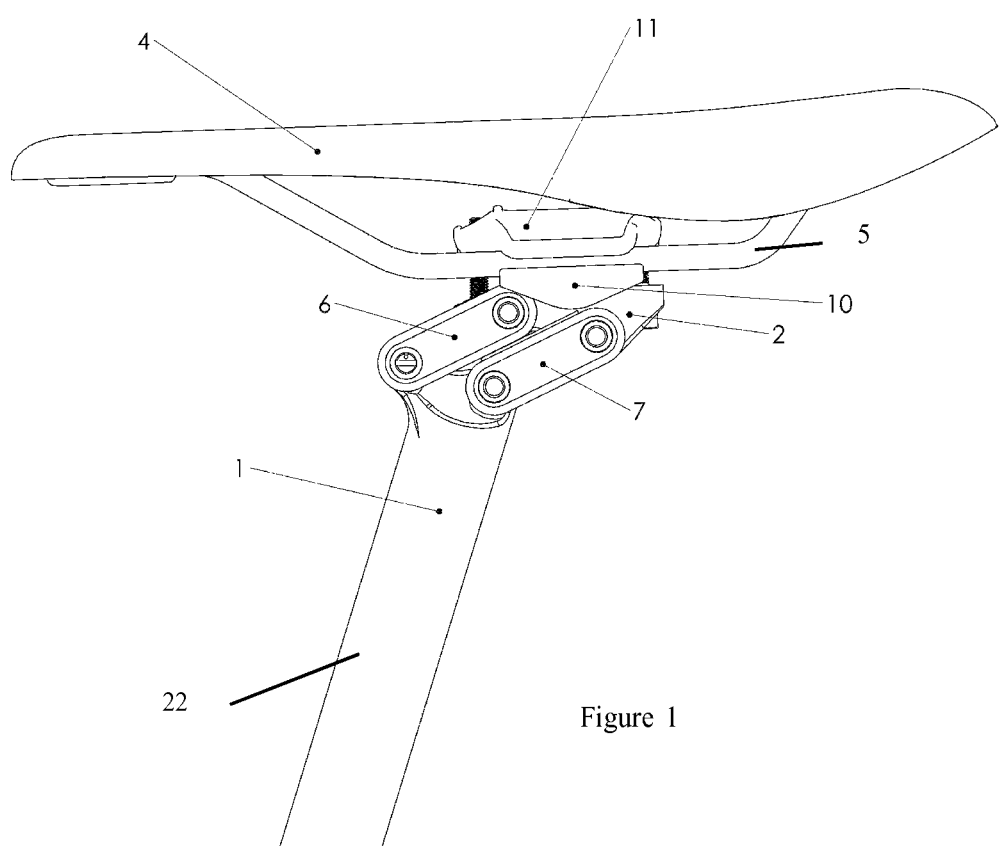
FIG. 1 is a side view of a seat position changer in the rearward position with a saddle installed.

Provided herein is a means for altering the position of a saddle on a bicycle without the use of tools or replacement of a seat post. As used herein, the term "bicycle" means a standard sized, adult, diamond framed bicycle, as commonly understood in the art. The bi-stable dual position changer as described herein is a four bar linkage with at least two stable resting positions, allowing a cyclist to quickly, easily, and reproducibly alternate between two seat positions, e.g., a traditional upright rearward position or a more aerodynamic forward position, as conditions or riding requirements change. As used herein, the term "four bar linkage" means a mechanical linkage mechanism having four links, connected together with four shafts to form a closed loop in which all of the shafts are substantially parallel to one another and substantially perpendicular to the links along at least one axis.

The seat position changer as described herein allows a cyclist to use one bicycle under a variety of conditions. For example, if a cyclist is riding on a flat road, in a time trial or triathlon, minimizing wind resistance is important and the cyclist may use the more aerodynamic forward riding position. Alternatively, when a cyclist is maneuvering or drafting within a group of cyclists or riding uphill, the cyclist may switch to a more traditional upright road riding position to provide more power or better handling of the bicycle under those conditions. In some circumstances, adopting an upright position can provide increased safety and comfort for the rider.

The seat position changer may be constructed from a variety of different materials. In some embodiments, the components may be constructed from essentially any material which provides sufficient structural rigidity for the application. Examples of appropriate materials include, but are not limited to, metals (e.g. aluminum, steel, stainless steel, titanium, magnesium, etc.), plastics (e.g. nylon, glass-filled nylon, acetal, polypropylene, ABS, etc.), wood, composites (e.g. carbon fiber), resin, rubber and foam. Fabrication of the components can be accomplished using a wide variety of established manufacturing techniques including, but not limited to, machining, molding, casting, extruding, forging, laminating, and welding.

In some embodiments, the four bar linkage of the seat position changer comprises an upper linkage, a lower linkage, a front linkage and a rear linkage. The linkages may be in any useful shape. In some embodiments, they may be a rectangular bar shaped linkage. In additional embodiments, the linkages may include a channel or hole through the ends allowing them to be connected together by a shaft.

The linkages are connected such that the saddle position can be changed between a forward position and rearward position while maintaining a consistent difference between (a) the seat-to-bottom-bracket length in the forward position and (b) the seat-to-bottom-bracket length in the rearward position. As used herein, the term "consistent difference" means that variability or deviation (if any) in the difference between (a) the seat-to-bottom-bracket length in forward position and (b) the seat-to-bottom-bracket length in the rearward position is imperceptible or immaterial to the rider across a range of bicycle installations. In one embodiment, the consistent difference in seat-to-bottom-bracket length is between about 0.01 cm to about 0.1 cm. In one embodiment, the consistent difference in seat-to-bottom-bracket-length is about 0.1 to 0.5 cm. In one embodiment, the consistent difference in seat-to-bottom-bracket-length is about 0.5 to 1 cm.

In one embodiment, the difference in seat-to-bottom-bracket-length between the forward position and the rearward position may be chosen by the rider. In one embodiment the difference in seat-to-bottom-bracket-length between the forward position and the rearward position is imperceptible to the rider. In one embodiment, the difference in seat-to-bottom-bracket-length between the forward position and the rearward position is between 0 and about 0.01 cm. In one embodiment, the difference in seat-to-bottom-bracket-length between the forward position and the rearward position is between about 0.01 mm to about 0.1 cm. In one embodiment, the difference in seat-to-bottom-bracket-length between the forward position and the rearward position is between about 0.1 cm to about 1 cm. In one embodiment, the difference in seat-to-bottom-bracket-length between the forward position and the rearward position is between about 1 cm to about 5 cm.

In one embodiment, the linkages are connected such that the saddle position can be changed between a forward and rearward position while maintaining a difference in seat-to-bottom-bracket length of about zero, such that the difference is imperceptible to the rider. As used herein, the term "consistent seat-to-bottom-bracket length in both positions" means maintaining a consistent difference in seat-to-bottom-bracket length of about zero when changing between a forward and rearward position.

In one embodiment, the linkages are connected such that the saddle position can be changed between a forward and rearward position while maintaining a consistent seat-to-bottom-bracket length in both positions. The seat-to-bottom bracket length remains consistent in both positions throughout the range of seat-to-bottom-bracket lengths generally found on standard adult bicycles. By maintaining consistent seat-to-bottom-bracket length in both positions, changes to the rider's knee angle (the angle between the rider's upper and lower leg when the leg is fully extended) between the forward and rearward seat positions are imperceptible or immaterial to the rider.

The change in seat-to-bottom bracket length between the two positions remains consistent throughout the range of seat-to-bottom-bracket lengths generally found on standard adult bicycles. In this embodiment, the seat-to-bottom-bracket length is quickly, consistently, and precisely changed to the rider's predefined specifications when the seat position is changed between the forward and rearward positions.

As used herein, the term "seat-to-bottom-bracket length" refers to the distance between a fixed point on a bicycle seat (e.g., the center of the saddle rails) and the bicycle's bottom bracket. The term "bottom bracket" is defined as the point where the axis of rotation of the bicycle crankset (made up of the pedals, crank arms, and chain rings) intersects the vertical center-plane of the bicycle. Throughout this application, reference is made to seat-to-bottom-bracket length. This term is used within the context of selecting specific riding positions for affecting a cyclist's pedaling motion. For example, preserving a cyclist's pedaling motion could include maintaining a consistent knee angle during the part of the pedal stroke where the cyclist's leg is most extended. Alternatively, purposefully changing a cyclist's pedaling motion could include configuring the seat changer to switch between perceptibly different seat-to-bottom-bracket-lengths when switching between the forward and rearward positions.

The upper and lower linkages of the four bar linkage of the seat position changer are independently connected to the front and rear linkages to form a mechanism that is approximately rectangular when transferring between positions and has a forward and rearward resting position, allowing for an easy change between positions and stability once the position is selected.

In one embodiment, the disclosed method of changing seat positions comprises securing the four bar linkage in a fixed position in which two linkages chosen from the upper linkage, the lower linkage, the front linkage, and the rear linkage rest against each other. For example, in one embodiment, the four bar linkage of the seat position changer could be configured such that the front and rear linkages rest against one another when positioned in either the forward position or the rearward position. In an alternate embodiment, the four bar linkage of the seat position changer could be configured such that the upper and lower linkages rest against one another when positioned in either the forward position or the rearward position. Within the context of this disclosure, the term "rest against" should be interpreted an including direct contact between two rigid bodies or contact that includes a non-rigid intermediary layer, such as a noise-absorbing and/or shock absorbing elastomeric material.

In some embodiments, the upper and lower or front and rear linkages rest against one another while having a thin elastomeric material sandwiched in between the two resting surfaces by affixing the elastomeric material to one or both of the surfaces. The elastomeric material could be any material capable of absorbing and dampening vibrational energy transferred through the bicycle, post, and/or four bar linkage. As used herein, the term "elastomeric material" means a material, such as natural or synthetic rubber, that is able to resume its original shape when a deforming force is removed. In one embodiment of the disclosed bi-stable dual position seat changer, a thin elastomeric material is affixed at a point where two linkages contact one another. In some embodiments, placing an elastomeric material between these contact points provides benefits by dampening, absorbing, or buffering the vibrational energy created by the act of riding a bicycle.

The four bar linkage formed by the lower linkage, the upper linkage, the front linkage, and rear linkage is designed to allow the saddle to move along a curved path between a rearward position and a forward position. The upper linkage and the front linkage are connected by a shaft which passes perpendicularly through the linkages. Each linkage can rotate about or around the axis of rotation to change the position of the saddle assembly. The front linkage and the lower linkage are connected by a second shaft passing perpendicularly through the front linkage and the lower linkage and allowing for a second axis of rotation around the second shaft. The lower linkage and the rear linkage are similarly connected by a perpendicular shaft forming a third axis of rotation about the third shaft. The upper linkage and the rear linkage are connected by a fourth shaft passing perpendicularly through the upper and rear linkages and providing a forth axis of rotation. In some embodiments the shafts may be conventional cylindrical shafts. In other embodiments, one or more shafts may include eccentric portions which are not coaxial with a shafts primary axis of rotation. In one embodiment, a shaft may pass through one or more bushings such as, but not limited to, eccentric bushings, solid sleeve bushings, and/or flanged bushings.

The seat may move through a curved path between a forward and rearward position by rotating about one or more of the shafts. In one embodiment, moving the seat through a curved path is accomplished by attaching the seat to a four bar linkage which governs the path of movement. In this embodiment, both the path and the angle (or tilt) of the seat are controlled by the geometry of the four bar linkage when moving between the rearward and forward positions.

The upper linkage of the seat position changer may be rigidly connected to the saddle by any means generally used to attach bicycle seat posts and saddle assemblies. As used herein the term "rigidly connected" means attached together, forming a solid, stiff junction. In other embodiments, multiple bolts may be used to securely attach the saddle and saddle clamp to the upper linkage.

In some embodiments of the invention, the lower linkage is integrated directly into the top of the seat post tube. In these embodiments, the invention replaces the entire bicycle seatpost and attaches directly to the frame of bicycle. In other embodiments, a clamp or joint may be used to attach the lower linkage to the seat post. In one embodiment of the invention, the lower linkage does not integrate directly with the seatpost tube, and instead includes a pair of parallel cylindrical rails which replicate the saddle rails found on the underside of a standard bicycle saddle. In this embodiment, the seat position changer can be attached to a standard seatpost by clamping these rails in the saddle clamp of the standard seatpost. In this embodiment, the seat position changer is placed between the seatpost and saddle of a standard bicycle.

The saddle further has at least two resting positions where one linkage contacts another linkage, creating a stop. In one example, the forward linkage contacts the aft linkage. In another example the upper linkage contacts the lower linkage. In some embodiments, an end stop is provided which prevents the saddle from moving too far forward or too far back. In additional embodiments, angular travel stops may be inserted where a portion of the forward and/or aft linkages rest on a part of the upper or lower linkage, limiting the range of motion of the seat. In other embodiments, the saddle may be maintained in the forward or aft position through the use of a detent. Any appropriate detent known to those of skill in the art may be used. In some embodiments, the detent may comprise a detent on one or more of the linkages, a detent rod which engages the detent, and a spring to apply force to the detent rod. In other embodiments, the action of the linkage mechanism and the weight of the cyclist serve to keep the saddle in the forward or aft position.

In one embodiment of the bi-stable dual position seat changer, at least one of the forward position and the rearward position is an energetically favored resting position. As used herein, the term "energetically favored resting position" means a position in which the gravitational and spring forces acting on the device favor that position. For example, for a seat changer having a range of motion spanning a curved path of movement, the "energetically favored resting position" would describe positions favored by the gravitational and spring forces acting on that range of motion. In one example, an energetically favored resting position would describe the lower endpoints of a curved path range of motion, where gravitational forces would favor moving the seat. In some embodiments, the linkages "rest against each other" in the energetically favored positions, providing additional rigidity and stability. For a bicycle seat changer, positioning the seat in an "energetically favored resting position" provides an advantage in terms of stability because the forces acting on the seat reinforce the positioning rather than working against the positioning. By positioning the seat in an "energetically favored resting position," the need for locking mechanisms and positions is often unnecessary. However, in some embodiments of this disclosure, locking positions are used to reinforce the security of either or both of the forward position or the rearward position of the bicycle seat changer. In one embodiment of the bi-stable dual position seat changer, each of the forward position and the rearward position is an energetically favored resting position.

The seat position changer moves between resting positions through a small curved path using the four bar linkage until the forward linkage and the aft linkage rest on each other. The length of the curved path may be adjusted by altering the distance between the second shaft and the third shaft and/or adjusting an eccentric bushing and/or eccentric shaft, allowing a cyclist to tailor the amount forward or aft that the seat is allowed to move during a ride to a cyclist's personal preferences. In some embodiments, spacers may be placed between the forward linkage and/or the aft linkage, limiting the curved path of travel in one or both directions and thus limiting the range of motion of the saddle.

One example of the seat position changer as described herein is shown with a saddle attached in a side view in the rearward position in FIG. 1. As used herein, the term "seat" means a surface on which a person sits. A bicycle seat should be understood as any seat attached to a bicycle, for example by way of attaching a seat to a seat post. As used in the art, the term bicycle "seat" should be understood as having the same meaning as a bicycle "saddle." As shown in FIG. 1, the rearward position places the saddle in a location comparable to a standard road bicycle saddle position with the centerline of the saddle clamp slightly offset behind the axis of the seat post and enables a rider to attain a traditional upright riding position. A lower linkage (1) is integrated with a seat post (22) such that they are formed as one piece. An upper linkage (2) is clamped by a saddle clamp lower (10) and a saddle clamp upper (11) to the saddle rails (5) such that the saddle (4) can be loosened and removed from the clamp. A front linkage (6) and rear linkage (7) may rotate along an axis to change the position of the seat (4). In some embodiments the four bar linkage may be removably attached to the seat post (22), such as with a clamp or other fastening device. The angle between the lower linkage (1) and the seat post (22) determines the path the saddle follows when the seat position changer is moved from the rearward to forward position or vice versa. In some embodiments the angle of the lower linkage (1) is set such that the saddle (4) to bottom bracket (not shown) distance is consistent regardless of whether the seat is in the forward or rearward position.

Figure 2:
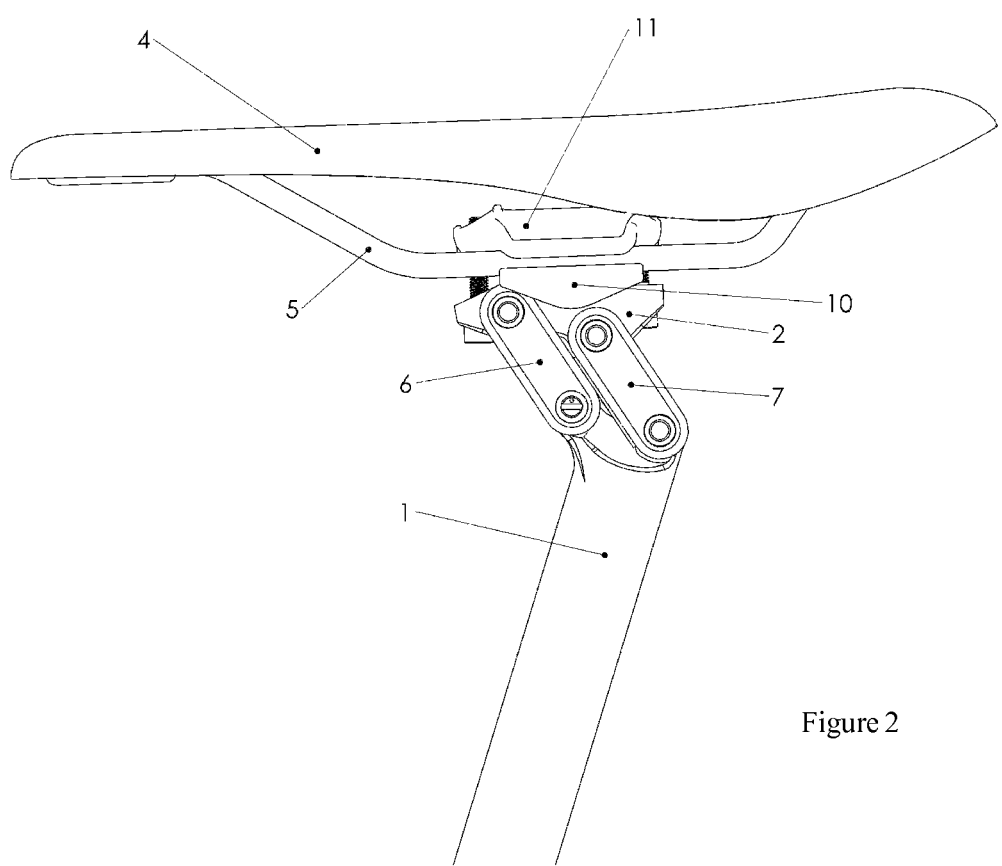
FIG. 2 is a side view of a seat position changer in the forward position with a saddle installed.

Referring now to FIG. 2, a side view of a seat position changer in the forward position is shown. This forward position places the saddle in a position often preferred during triathlon training and racing, allowing a cyclist to obtain a more aerodynamic position. As can be seen in comparison to FIG. 1, the angle of the front linkage (6) and rear linkage (7) have changed. Also, compared to FIG. 1, the saddle (4), saddle clamp lower (10) and saddle clamp upper (11) have moved forward relative to the position of the lower linkage (1), which is integrated with the seat post (22).

Figure 3:
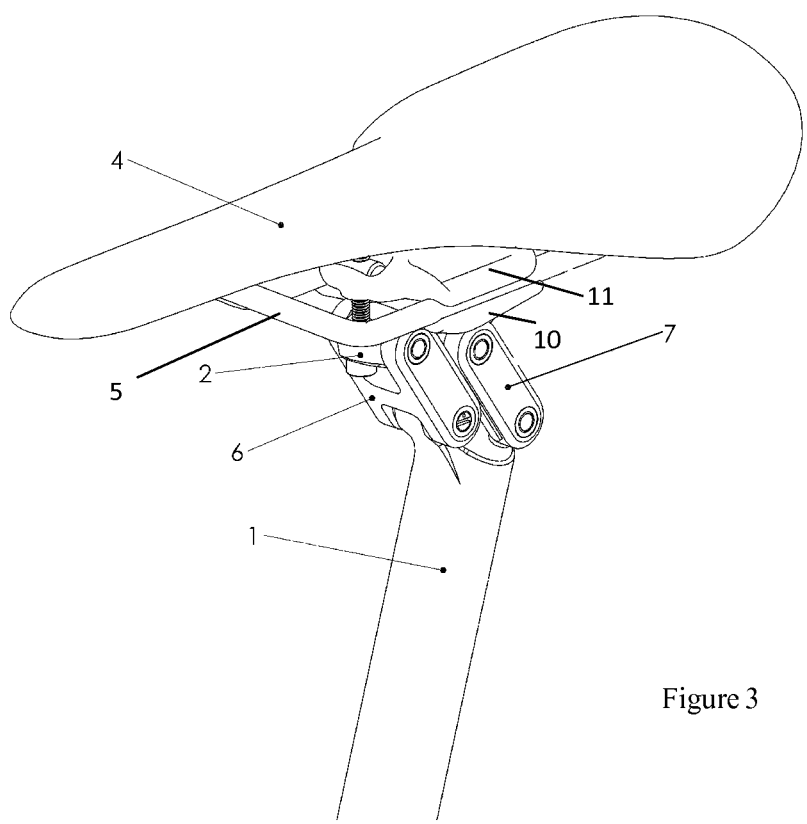
FIG. 3 is an isometric view of a seat position changer in the forward position with a saddle installed.

An isometric view of the seat position changer in the forward position is shown in FIG. 3. As shown, a first end of the front linkage (6) is connected to a first end of the lower linkage (1), which is integrated with the seat post. A first end of the rear linkage (7) is connected to a second end of the lower linkage (1). A first end of the upper linkage (2) is connected to a second end of the front linkage (6). A second end of the rear linkage (7) is connected to a second end of the upper linkage (2). The upper linkage (2) is further connected to the saddle (4) by clamping the saddle rails (5) between the lower saddle clamp (10) and the upper saddle clamp (11).

Figure 4:
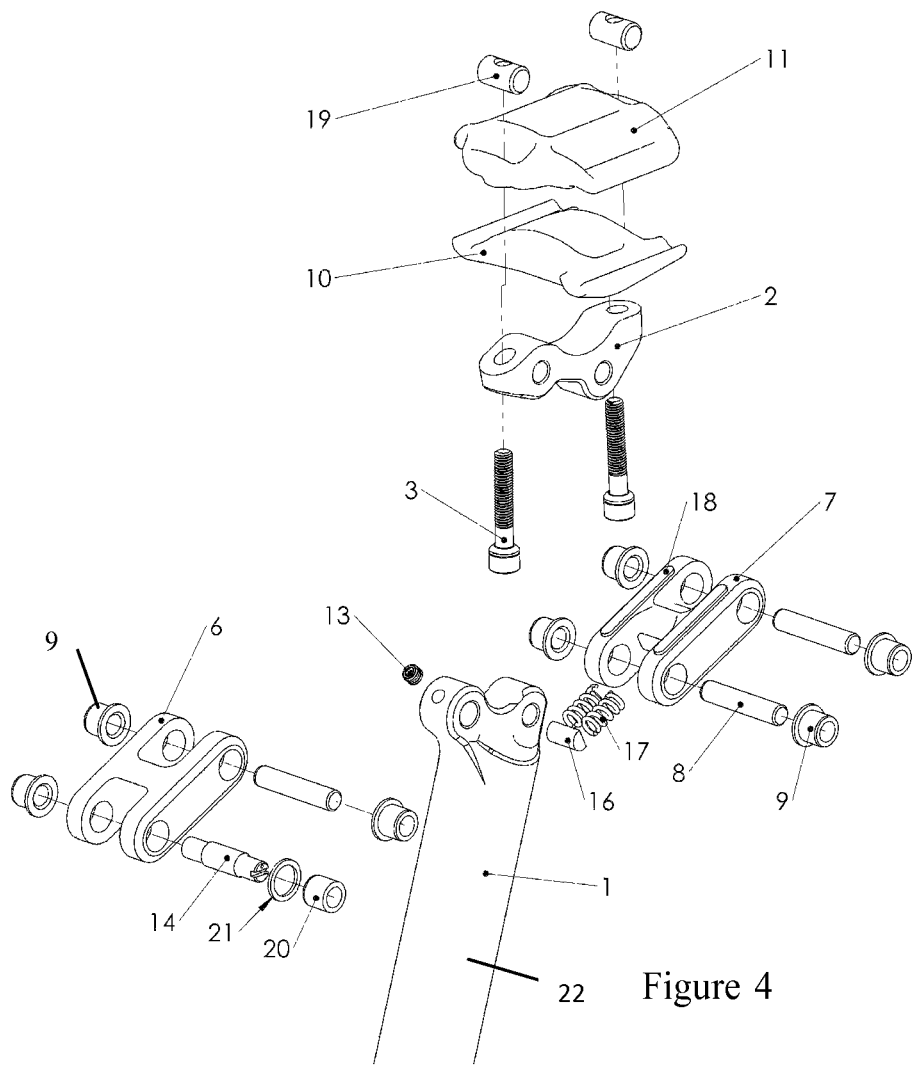
FIG. 4 is an exploded isometric view of a seat position changer.

An exploded isometric view of a seat position changer as shown in FIG. 4 provides additional detail. The seat post (22) is integrated with the lower linkage (1) of the seat position changer. A first end of the front linkage (6) fits around the front end of the lower linkage (1). The front linkage (6) fastens around the lower linkage (1) by means of any fastener generally used to attach such pieces including, but not limited to, a bolt, a screw, a peg, a linkage shaft, and the like. As shown in FIG. 4, a linkage shaft (14) passes through a shaft bushing sleeve (20) and a thrust washer (21) through a first side of the front linkage (6), out a second side of the front linkage (6), through a first side of the front end of the lower linkage (1), out a second side of the front end of the lower linkage (1) through a third side of the front linkage (6), out a fourth side of the front linkage and through a flanged bushing (9) to lock in place. In some embodiments the linkage shaft (8) is the same at all connection points. In other embodiments, different linkage shafts may be used at different connection points. For example, the shaft (8) may be the same through both a first end of the front linkage (6) and a second end of the front linkage (6), or the shafts (8) and (14) may be different as shown. The bushing (9) is an approximately cylindrical lining for an opening used to limit the size of the opening, resist abrasion, or serve as a guide. Any type of lining that will serve this purpose may be used, or no lining at all may be used. A bushing may be of any type generally used, including, but not limited to, an eccentric bushing, a standard bushing, a flanged bushing, a solid sleeve bushing, or a combination thereof. Similarly to the front linkage (6), a shaft (8) passes through a flanged bushing (9) through a first side of the rear linkage (7), out a second side of the rear linkage (7), through a first side of the back end of the lower linkage (1), out a second side of the back end of the lower linkage (1) through a third side of the rear linkage (7), out a fourth side of the rear linkage (7), and through a flanged bushing (9).

Additionally as shown in FIG. 4, a second end of the front linkage (6) is attached to the upper linkage (2) of the seat position changer. A linkage shaft (8) passes through a flanged shaft bushing (9) and through a hole in a first side of a second end of the front linkage (6). The linkage shaft (8) then passes through a first side of the front end of the upper linkage (2), out a second side of the upper linkage (2) through a third side of the second end of the front linkage (6), out a fourth side of the second end of the front linkage (6), though a flanged bushing (9).

A second end of the rear linkage (7) is attached to the upper linkage (2) of the seat position changer. A linkage shaft (8) passes through a flanged shaft bushing (9) and through a hole in a first side of the rear linkage (7). The linkage shaft (8) then passes through a first side of a second end of the upper linkage (2), out a second side of the second end of the upper linkage (2) through a third side of the second end of the rear linkage (7), out a fourth side of the second end of the rear linkage (7), though a flanged bushing (9). In some embodiments, the shafts are secured by being press fit into a lower linkage (1) or upper linkage (2).

The seat position changer is attached to the saddle rails (not shown) by any means or series of clamps generally used. In one embodiment, the seat position changer is attached to the saddle rails using a clamping system comprising saddle clamp bolts (3), a saddle clamp lower piece (10) and a saddle clamp lower piece (11). The saddle clamp bolts (3) pass through the upper linkage (2), around the saddle clamp lower piece (10), through the saddle clamp upper piece (11) and into a saddle clamp nut (19), clamping the saddle rails (not shown) between the saddle clamp lower piece (10) and the saddle clamp upper piece (11). In some embodiments, the facing sides of the saddle clamp lower piece (10) and the saddle clamp upper piece (11) contain a groove for attaching to the saddle rails (not shown).

Different sized cyclists can be accommodated on the seat position changer by changing the length of the front (6) and rear (7) linkages, thus increasing or decreasing the distance between the rearward and forward positions. The range of motion in each direction is set by the geometry of the linkages such that at either end of the curved path, either the front (6) and rear (7) linkages, or the upper (2) and lower (1) linkages are resting on each other. This provides for two stable positions, allowing the cyclist to sit, stand, and pedal securely in either the forward or rearward positions. In some embodiments, a section of elastomeric material may be attached to the front (6) and rear (7) linkages at the location where the two linkages rest against each other in the rearward and forward positions. In another embodiment, a section of elastomeric material may be attached to the upper (2) and lower (1) linkages at the location where the two linkages rest against each other. The elastomeric material (18) muffles or eliminates noise generated if the front and rear linkages temporarily separate and come back into contact such as when a rider hits a bump or during other instances where forces push the saddle assembly off of one of its end stops. In other embodiments, a more significant amount of elastomeric material (18) may be attached to the front (6) and rear (7) linkages to absorb shock and vibration that is transmitted to the cyclist through the seat post.

In one embodiment, the bi-stable dual position seat changer comprises a seat, rigidly connected to the said upper linkage and forming a seat angle, said seat angle determined by comparing the plane of the seat to the plane of the ground when the said bi-stable dual position seat changer is installed in an upright bicycle with its wheels positioned on a flat surface; and wherein the seat angle in the rearward resting position differs from the seat angle in the forward resting position. By configuring the seat changer with different saddle tilt in the forward and rearward positions, the rider can easily, rapidly, and reliably change the seat angle by switching from a forward position to a rearward position.

As used herein, the term "seat angle" refers to the angle formed between the plane of the seat to the plane of the ground when a bicycle seat is installed in an upright bicycle with its wheels positioned on a flat surface. Most often bicycles are set up so that the seat angle is fairly close to horizontal, meaning that the plane of the bicycle seat is parallel to the plane of the ground when the bicycle seat is installed in an upright bicycle with its wheels positioned on a flat surface. However, many riders prefer slightly adjusting the seat angle by tilting the seat up or down. Changing the seat angle is also referred to as changing the "tilt" of the seat.

Figure 5:
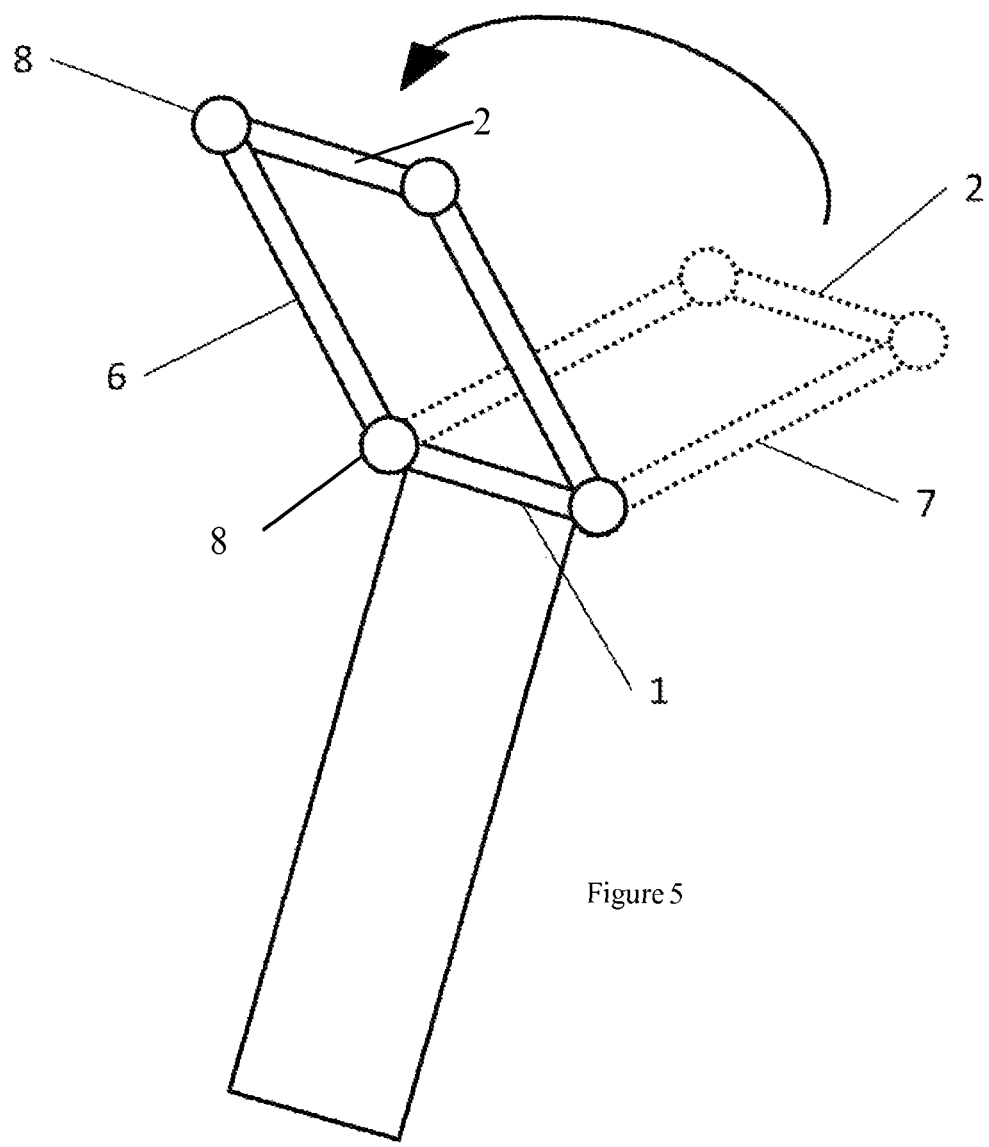
FIG. 5 is a simplified side view of a four bar linkage attached to a seat post in the rearward (dotted lines) and forward positions (solid lines).
Figure 6:
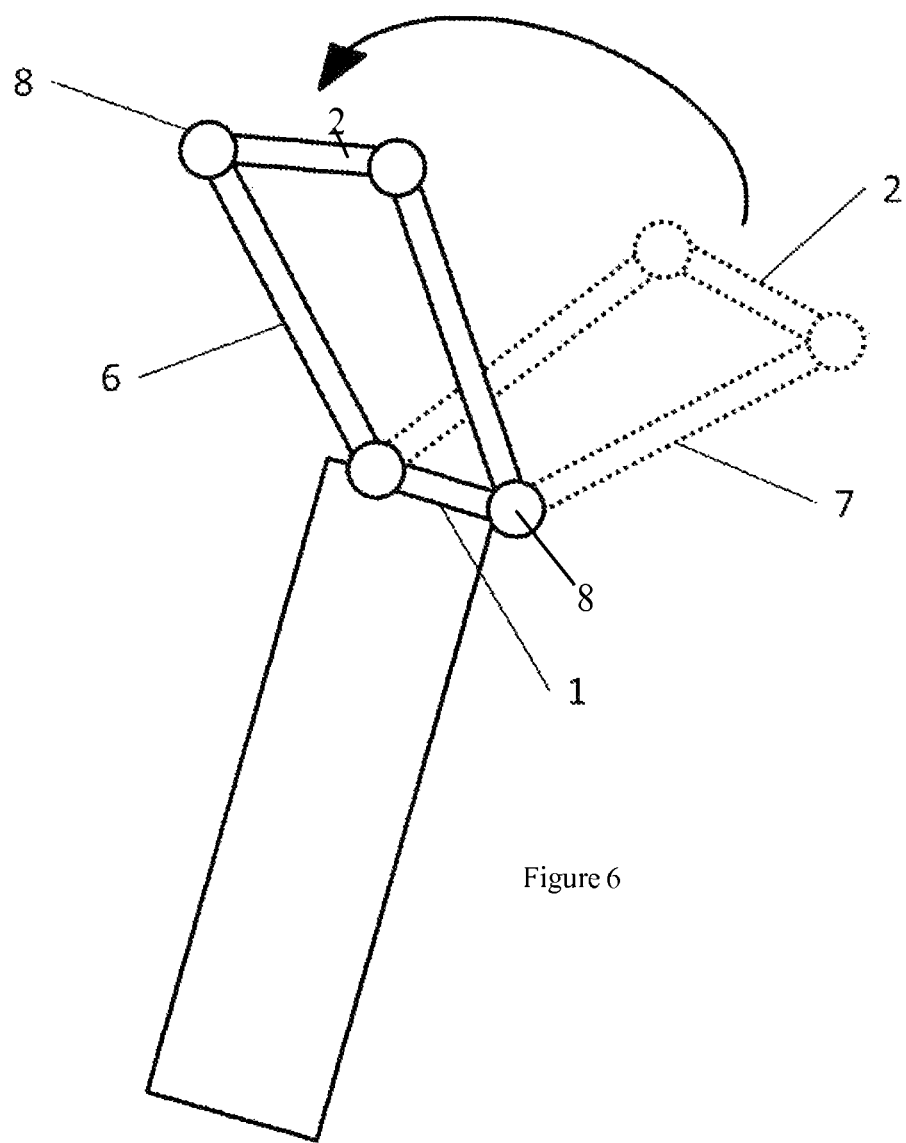
FIG. 6 is a simplified side view of a four bar linkage attached to a seat post in the rearward (dotted lines) and forward positions (solid lines).

FIGS. 5 and 6 demonstrate how different linkage lengths within the four bar linkage can be altered to achieve different seat angles relative to the seat post. As shown in FIG. 5, the angles of the upper linkage (2) to the lower linkage (1) are the same in both the rearward (dotted lines) and forward (solid lines) position. In FIG. 5, the linkages are connected by four linkage shafts (8) (represented here by the balls on the ends of the linkages). The upper linkage (2) rotates forward to change the position of the saddle from rearward (dotted lines) to forward (solid lines), but the seat angle does not change. FIG. 6 shows a shorter lower linkage (1) which causes the upper linkage angle to change relative to the lower linkage (1) when changing positions such that seat angle is different in the forward position.

Figure 7:
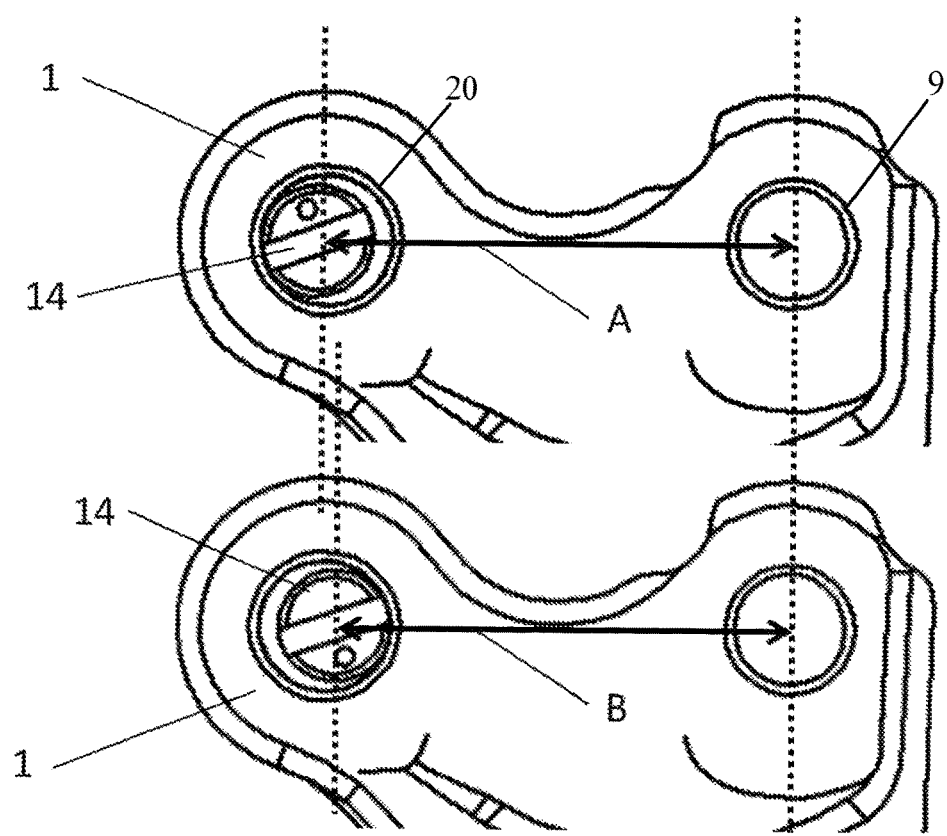
FIG. 7 is a detailed side view of two lower linkages juxtaposed to show a change in shaft position by rotating an eccentric shaft.
Figure 8:
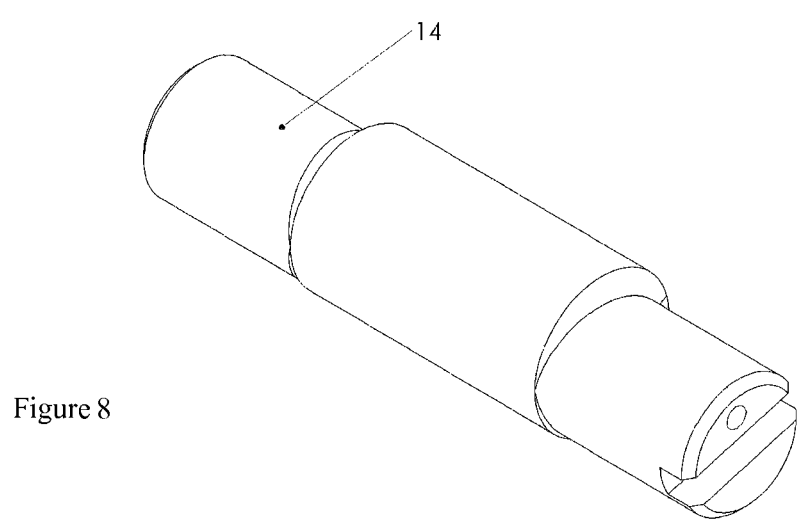
FIG. 8 is an isometric view of an eccentric shaft.

In some embodiments, length of the lower linkage may be altered through the use of an eccentric shaft or bushing. For example, the shaft (14) may be eccentric such that the central section of the shaft is not concentric with the end portions of the shaft as shown in FIG. 8. The shaft (14) can rotate within the front lower linkage bore allowing the axis of the end portions of the shaft (14) to move perpendicular to the axis of the central section thus changing the effective distance between the front and rear linkage pivot points as shown in FIG. 7. This allows the saddle to be tilted at a different angle in the forward position relative to the rearward position. The adjustment is made on the eccentric shaft (14) seen in FIG. 7. The eccentric shaft (14) shown in FIG. 8 is adjustable. In one embodiment, the bi-stable dual position seat changer comprises a means for changing the location of the axis of rotation of at least one shaft. As used herein, the term "means for changing the location of the axis of rotation of the at least one shaft" refers to any mechanical device capable of moving the location of the axis of rotation of the shaft. In one embodiment, changing the axis of rotation of the at least one shaft is accomplished by incorporating an eccentric element into the shaft. For example, an eccentric element would include a "shaft having sections offset from the center." In another embodiment, in the lower linkage (1) inserts which have shaft bores at precise locations that position the shaft to achieve different amounts of forward saddle tilt are used. The inserts are retained in the lower linkage with a clamping bolt or set screw. An alternative embodiment removes this adjustability all together and replaces the eccentric shaft (14) with standard shafts (8). Another embodiment uses eccentric bushings instead of eccentric shafts to change the location of the axis of rotation of a shaft (8).

In one embodiment, the disclosed method of changing seat positions comprises securing the four bar linkage by applying force to at least one of upper linkage, a lower linkage, a front linkage, and a rear linkage. As used herein, the term "securing the four bar linkage by applying force to at least one of upper linkage, a lower linkage, a front linkage, and a rear linkage" means applying force through a mass to the surface of one of the linkages to create friction between the mass and the linkage. Applying force in this manner results in added security by requiring the user to overcome a certain degree of static friction in order to move the four bar linkage. The degree of security can be modified by adjusting the amount of static friction by choosing the desired amount of force and coefficient of static friction. In one embodiment, securing the four bar linkage includes applying force via a spring to a rod. In another embodiment, securing the four bar linkage includes a detent mechanism, such that applying force via a spring to a rod causes the rod to engage with a detent profile in one of the linkages. Once engaged, the rod and detent interaction provide a barrier to moving out of that position, thereby adding stability and security to the chosen position. In one embodiment, the disclosed method of changing seat positions comprises applying spring force through a detent rod to at least one of upper linkage, a lower linkage, a front linkage, and a rear linkage. In one embodiment, the detent rod engages with a detent, securing the four bar linkage into position.

Figure 9:
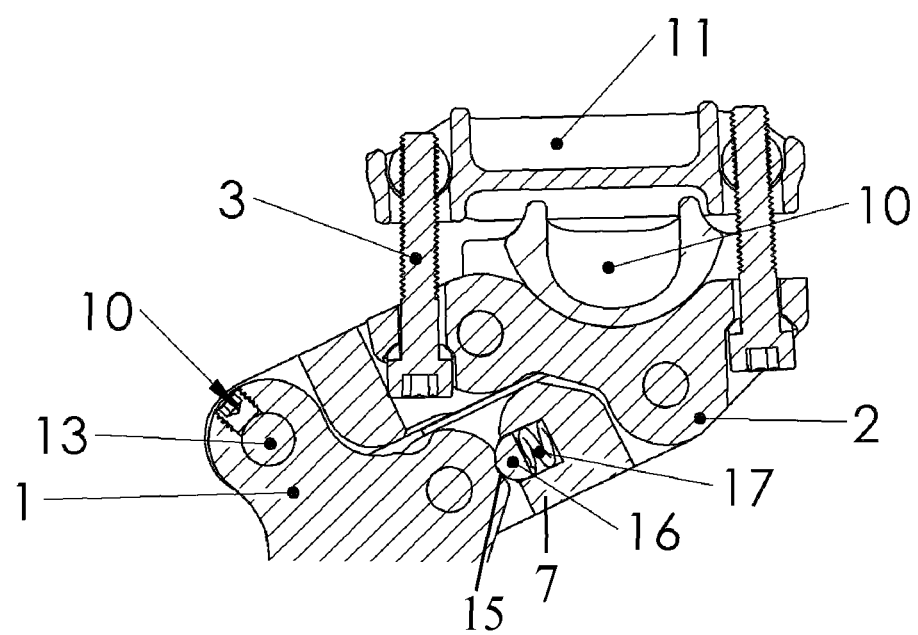
FIG. 9 is a detailed cross-section of a four bar linkage showing an example of how a detent mechanism and eccentric elements may be configured within a four bar linkage.

In some embodiments, as shown in FIG. 9, a detent (15) may be used to hold the saddle in place in the forward or rearward positions against an end stop (not shown). Any type of detent mechanism known to those of skill in the art may be used, for example, a lever, a pin, a spring loaded catch, or ratcheting mechanism. In some embodiments, the detent mechanism may be a spring loaded rod as shown in FIG. 9. The spring (17) and rod (16) sit in the rear linkage (7) and apply force to a detent profile (15) in the lower linkage (1). The spring (17) loaded rod (16) rod is forced into a linkage detent profile (15) when the saddle is in either the rearward or forward position. The rod (16) applies force to the lower linkage (1) such that the saddle will remain in place until enough force is applied in the opposite direction to push the rod (16) out of the detent profile (15), allowing the linkage to rotate to the other position. In some embodiments, the detent profile (15) in the lower linkage (1) is designed such that when the seat changer mechanism is close to either the rearward or forward position the force generated by the spring (17) and rod (16) will push the seat changer towards an end stop. The force required to move the seat changer is easily applied with a single hand allowing the cyclist to change the position of the seat to the forward or rearward position while riding the bicycle and without the use of additional tools. Alternatively, the rider can move the saddle by using the inner thighs to squeeze the saddle and apply a slight upward and forward or backward force, allowing the cyclist to maintain two hands on the handlebar. In some embodiments, the detent may be composed of magnets between two moving linkages. When the four bar linkage approaches the rearward or forward position, the magnets come into alignment and keep the saddle in the desired position.

In one embodiment, the detent rod and spring are housed in the rear linkage, applying force to the lower linkage, and engaging a detent profile on the lower linkage. In another embodiment, the detent rod and spring are housed in the upper linkage, applying force to the front linkage, and engaging a detent profile on the front linkage. Other arrangements of the detent mechanism are possible, provided that they serve to stabilize the desired seat positions, for example positions providing the rider with a consistent seat-to-bottom-bracket-length.

In additional embodiments, a locking mechanism for either the forward or rearward position or both requires the cyclist to actuate a button or lever or use a tool to release the mechanism from its current position. In some embodiments the actuator could be located directly on the mechanism.

Figure 10:
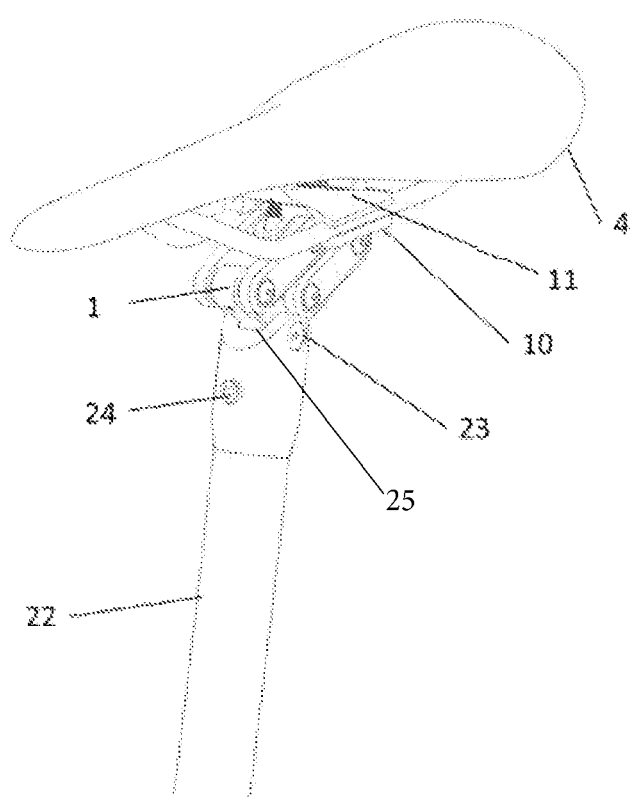
FIG. 10 is an isometric view of the seat position changer showing an example means of adjustably attaching the lower linkage to the seat post.
Figure 11:
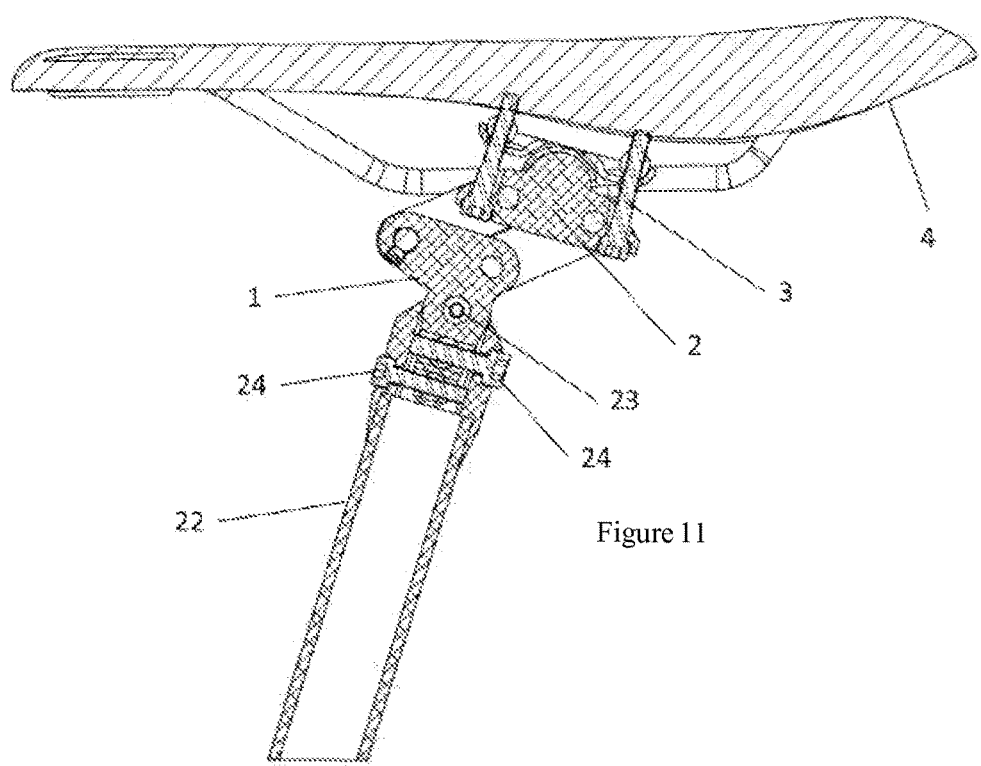
FIG. 11 is a side cross-section view of the seat position changer showing an exemplary means of adjustably attaching the lower linkage to the seat post.

In one embodiment, as shown in FIGS. 10 and 11, the lower linkage (1) is rigidly connected to the seat post (22) using a joint (25) that allows for angular adjustment between the lower linkage (1) and the seat post (22). Changing the angle between the lower linkage (1) and the seat post (22) alters the trajectory of the curved path that the seat (4) travels on between the forward and rearward positions. Changing the trajectory of the curved path allows the user to increase or decrease the seat-to-bottom-bracket length in the forward position relative to the seat-to-bottom-bracket length in the rearward position. This embodiment uses a pinned connection (23) between the lower linkage (1) and seat post (22), as well as a pair of bolts (24) to adjust the angle of the lower linkage (1) relative to the seat post (22) and to fix its position relative to the seat post (22).

In an alternative embodiment, the lower linkage is shaped so that it interfaces directly with the saddle clamping mechanism of any standard seat post. In this embodiment, the lower linkage may include geometry that replicates the rails of a standard bicycle saddle, allowing it to be clamped directly into any standard seat post in the same manner that a saddle would be clamped into a standard seat post. Alternatively, the lower linkage may include geometry that replicates portions of the saddle clamp geometry found on any standard seat post, allowing the lower linkage to replace certain saddle clamp pieces of the seat post assembly. In these embodiments, changes to the tilt adjustment mechanism on the standard seat post result in an effective change to the angle between the lower linkage and the seat post, thereby altering the trajectory of the curved path of the seat.

While several embodiments of a seat position changer have been shown and described, it will be apparent to those skilled in the art that various modifications may be made without departing from the spirit of the seat position changer described herein.

We claim:

1. A bi-stable dual position seat changer, comprising:
 a four bar linkage having a forward position and a rearward position, each of said forward position and said rearward position providing a consistent seat-to-bottom-bracket-length wherein said four bar linkage comprises an upper linkage, a lower linkage, a front linkage, a rear linkage;
 a first shaft, connecting the upper linkage to the front linkage by passing perpendicularly through each of the upper linkage and front linkage and forming a first axis of rotation about the first shaft;
 a second shaft, connecting the front linkage to the lower linkage by passing perpendicularly through each of the front linkage and lower linkage and forming a second axis of rotation about the second shaft;
 a third shaft, connecting the lower linkage to the rear linkage by passing perpendicularly through each of the lower linkage and rear linkage and forming a third axis of rotation about the third shaft;
 a fourth shaft, connecting the rear linkage to the upper linkage by passing perpendicularly through each of the rear linkage and upper linkage and forming a fourth axis of rotation about the fourth shaft; and
 a detent mechanism configured for alternatively securing the four bar linkage in the forward position and the rearward position.

2. The bi-stable dual position seat changer of claim 1, wherein at least one of the forward position and the rearward position is an energetically favored resting position.

3. The bi-stable dual position seat changer of claim 1, wherein each of the forward position and the rearward position is an energetically favored resting position.

4. The bi-stable dual position seat changer of claim 1, wherein the detent mechanism comprises:
 a detent on the four bar linkage; and
 a spring-loaded detent rod positioned to engage the detent.

5. The bi-stable dual position seat changer of claim 1, wherein two linkages chosen from the upper linkage, the lower linkage, the front linkage, and the rear linkage contact one another in a position chosen from the forward position and the rearward position.

6. The bi-stable dual position seat changer of claim 5, comprising an elastomeric material affixed to at least one of the front linkage or the rear linkage.

7. The bi-stable dual position seat changer of claim 1, wherein the bi-stable dual position seat changer comprises a means for changing the location of the axis of rotation of at least one shaft.

8. The bi-stable dual position seat changer of claim 7, wherein the means for changing the location of the axis of rotation of the at least one shaft comprises an eccentric element.

9. The bi-stable dual position seat changer of claim 8, wherein the eccentric element comprises a shaft having a center and sections offset from the center.

10. The bi-stable dual position seat changer of claim 1, comprising a seat, rigidly connected to the upper linkage and forming a seat angle, wherein the seat angle in a first resting position differs from the seat angle in a second resting position.

* * * * *